(12) United States Patent
Duffield

(10) Patent No.: US 8,442,827 B2
(45) Date of Patent: May 14, 2013

(54) SYSTEM AND METHOD FOR CUSTOMIZED VOICE RESPONSE

(75) Inventor: Nicholas Duffield, Summit, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 377 days.

(21) Appl. No.: 12/818,821

(22) Filed: Jun. 18, 2010

(65) Prior Publication Data

US 2011/0313767 A1 Dec. 22, 2011

(51) Int. Cl.
*G10L 15/00* (2006.01)
*G10L 21/00* (2006.01)
*G06F 17/28* (2006.01)
*G06F 17/27* (2006.01)
*H04M 1/64* (2006.01)

(52) U.S. Cl.
USPC ........... 704/254; 704/231; 704/236; 704/251; 704/257; 704/2; 704/9; 704/275; 379/88.01

(58) Field of Classification Search .................. 704/231, 704/236, 251, 254, 257, 9, 2, 275; 379/88.01
See application file for complete search history.

(56) References Cited

U.S. PATENT DOCUMENTS

| | | | | |
|---|---|---|---|---|
| 7,231,019 B2* | 6/2007 | Pascovici | ................... | 379/88.02 |
| 7,328,155 B2* | 2/2008 | Endo et al. | ................... | 704/251 |
| 7,623,632 B2* | 11/2009 | Bushey et al. | ............. | 379/88.01 |
| 7,630,900 B1* | 12/2009 | Strom | ........................... | 704/275 |
| 7,716,049 B2* | 5/2010 | Tian | ............................... | 704/251 |
| 7,852,993 B2* | 12/2010 | Ju et al. | ....................... | 379/88.02 |
| 2005/0080632 A1* | 4/2005 | Endo et al. | .................... | 704/277 |
| 2007/0016401 A1* | 1/2007 | Ehsani et al. | ..................... | 704/9 |
| 2008/0091435 A1* | 4/2008 | Strope et al. | ................. | 704/277 |
| 2009/0041212 A1* | 2/2009 | Erhart et al. | ............... | 379/88.16 |
| 2010/0223056 A1* | 9/2010 | Kadirkamanathan | ......... | 704/235 |
| 2011/0093265 A1* | 4/2011 | Stent et al. | ..................... | 704/243 |
| 2011/0295590 A1* | 12/2011 | Lloyd et al. | ....................... | 704/8 |

* cited by examiner

*Primary Examiner* — Paras D Shah

(57) ABSTRACT

Disclosed herein are systems, methods, and non-transitory computer-readable storage media for approximating an accent source. A system practicing the method collects data associated with customer specific services, generates country-specific or dialect-specific weights for each service in the customer specific services list, generates a summary weight based on an aggregation of the country-specific or dialect-specific weights, and sets an interactive voice response system language model based on the summary weight and the country-specific or dialect-specific weights. The interactive voice response system can also change the user interface based on the interactive voice response system language model. The interactive voice response system can tune a voice recognition algorithm based on the summary weight and the country-specific weights. The interactive voice response system can adjust phoneme matching in the language model based on a possibility that the speaker is using other languages.

19 Claims, 4 Drawing Sheets

SYSTEM AND METHOD FOR CUSTOMIZED VOICE RESPONSE

BACKGROUND

1. Technical Field

The present disclosure relates to spoken dialog systems and more specifically to approximating a region, dialect, or accent of a speaker.

2. Introduction

Interactive voice response (IVR) systems encounter many different regional and national languages, dialects, accents, vocabularies, and other language variations. The differences between these variations can be vast. Language models can be used to enhance understanding of various languages, but the IVR system does not know in advance which language model to apply. One approach to this problem is to analyze user speech on the fly and determine which language model fits. However, the problem with this approach is that the user speech is not recognized efficiently during the initial analysis step and may be recognized incorrectly.

Another approach to this problem is to ask the user to indicate language preferences, but that introduces an additional iteration with the user which slows down the interaction and may seem intrusive or imposing to some users. Yet another approach is to require users to create a user profile that indicates language preferences. However, this approach has the shortcoming of requiring users to create a profile, which some users resist, and does not work in settings where user profiles are not expected or not feasible.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can be used to determine a language, dialect, accent, vocabulary, or other language variation of a speaker even before the speaker begins speaking. The IVR system collects data associated with customer specific services, such as television subscriber information, digital video recorder usage, landline and cellular phone service and usage information, internet usage information, caller location, and so forth. Based on the collected data, the system generates country or dialect specific weights for each customer specific service and generates a summary weight of the aggregation of the country or dialect specific weights. Then the system can set an internal IVR system language model based on the summary weight and the country-specific weights. This approach may be more successful when supplied with a large number of data points, such as the data available to a telecommunications company that provides telephone, cellular phone, wired and wireless internet, cable television, and other services.

This approach allows the IVR system to determine an appropriate language model for recognizing user speech before the user begins speaking, and without requiring the user to sign up with an IVR profile in advance or manually select a language.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for determining a caller language in an IVR system. A system, method and non-transitory computer-readable media are disclosed which approximate an accent source for a speaker. A discussion of a basic general purpose system or computing device in FIG. 1 which can be employed to practice the concepts is disclosed herein. Then the disclosure discusses at a high level the natural language dialog system shown in FIG. 2. A more detailed description of methods will then follow. These variations shall be discussed herein as the various embodiments are set forth. The disclosure now turns to FIG. 1.

Figure 1:
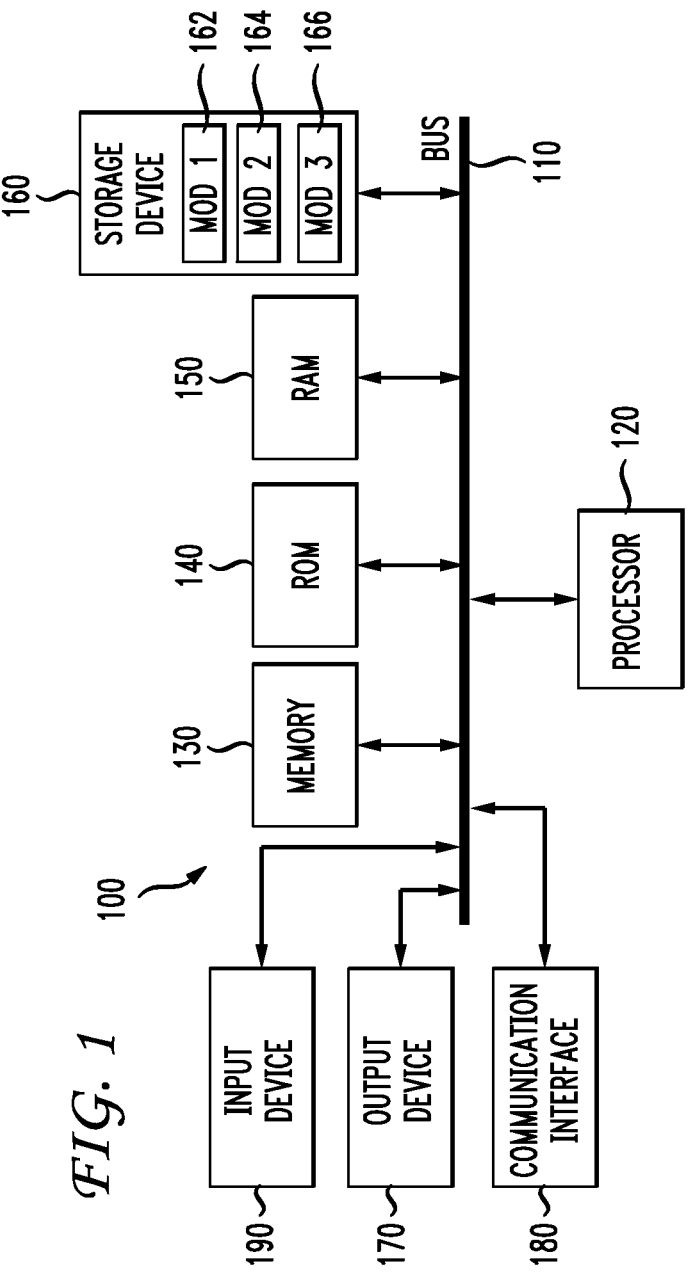
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache of high speed memory connected directly with, in close proximity to, or integrated as part of the processor 120. The system 100 copies data from the memory 130 and/or the storage device 160 to the cache for quick access by the processor 120. In this way, the cache provides a performance boost that avoids processor 120 delays while waiting for data. These and other modules can be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
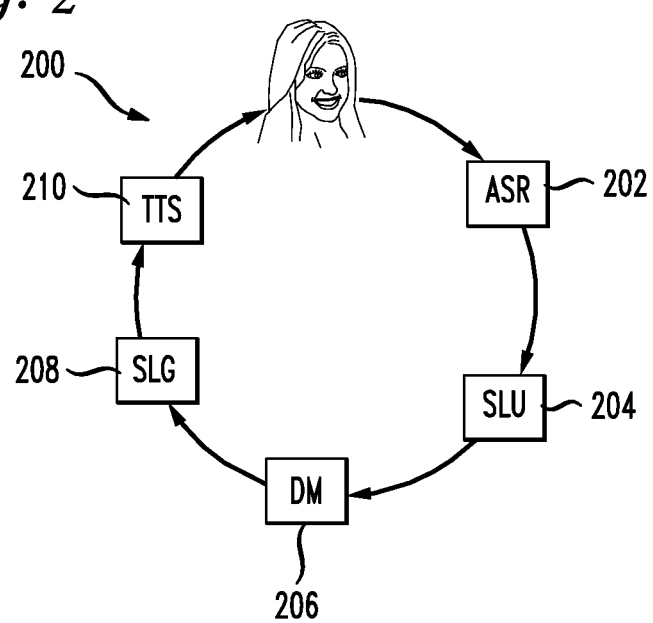
FIG. 2 is a functional block diagram that illustrates an exemplary natural language spoken dialog system.

FIG. 2 is a functional block diagram that illustrates an exemplary natural language spoken dialog system. Spoken dialog systems aim to identify intents of humans, expressed in natural language, and take actions accordingly, to satisfy their requests. Natural language spoken dialog system 200 can include an automatic speech recognition (ASR) module 202, a spoken language understanding (SLU) module 204, a dialog management (DM) module 206, a spoken language generation (SLG) module 208, and a text-to-speech (TTS) module 210. The TTS module 210 can be replaced by a more generic synthesizing (SM) module which can synthesize speech in other ways that text-to-speech. The synthesizing module can be any type of speech output module. For example, it can be a module wherein one prerecorded speech segment is selected and played to a user. Thus, the synthesizing module represents any type of speech output. The present disclosure focuses on innovations related to the ASR module 202 and can also relate to other components of the dialog system.

The ASR module 202 analyzes speech input and provides a textual transcription of the speech input as output. SLU module 204 can receive the transcribed input and can use a natural language understanding model to analyze the group of words that are included in the transcribed input to derive a meaning from the input. The role of the DM module 206 is to interact in a natural way and help the user to achieve the task that the system is designed to support. The DM module 206 receives the meaning of the speech input from the SLU module 204 and determines an action, such as, for example, providing a response, based on the input. The SLG module 208 generates a transcription of one or more words in response to the action provided by the DM 206. The synthesizing module 210 receives the transcription as input and provides generated audible speech as output based on the transcribed speech. Speech can be produced text-to-speech, unit selection, or other known mechanism for producing speech.

Thus, the modules of system 200 recognize speech input, such as speech utterances, transcribe the speech input, identify (or understand) the meaning of the transcribed speech, determine an appropriate response to the speech input, generate text of the appropriate response and from that text, generate audible "speech" from system 200, which the user then hears. In this manner, the user can carry on a natural language dialog with system 200. Those of ordinary skill in the art will understand the programming languages for generating and training ASR module 202 or any of the other modules in the spoken dialog system. Further, the modules of system 200 can operate independent of a full dialog system. For example, a computing device such as a smartphone (or any processing device having a phone capability) can include an ASR module wherein a user says "call mom" and the smartphone acts on the instruction without a "spoken dialog."

Figure 3:
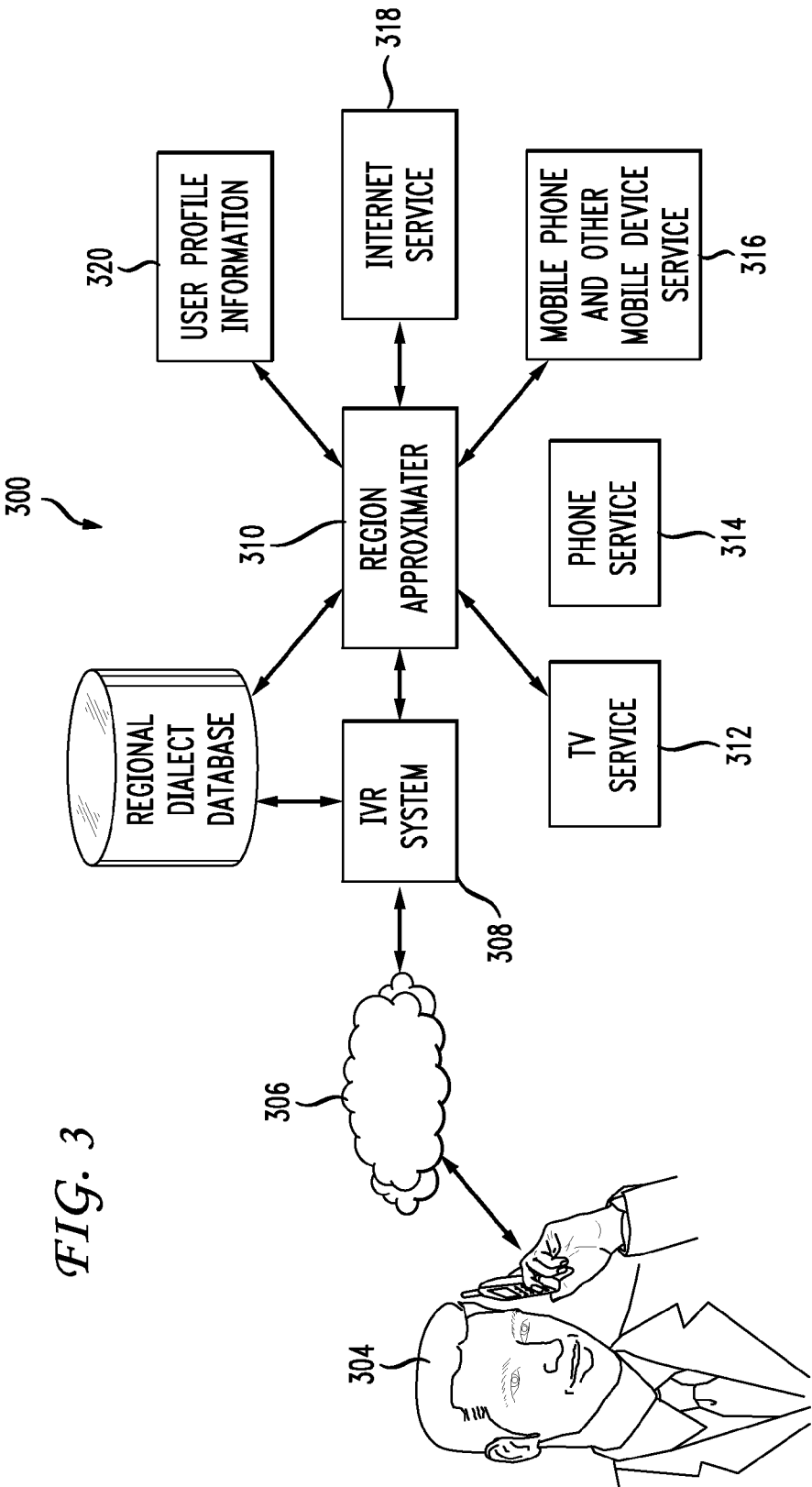
FIG. 3 illustrates an exemplary interactive voice response (IVR) system with supporting infrastructure for approximating a region or accent source.

Having disclosed some basic system and ASR components, the disclosure now turns to the exemplary system embodiment 300 shown in FIG. 3. In this example, a user 304 calls an IVR system 308 over a telecommunications network 306. The user can call via a cellular phone, landline phone, Internet-enabled voice chat, and so forth. The telecommunications network can be a private network or a public packet-switched network, for example. The IVR system 308 identifies the caller and transmits that information to the region approximater 310. The IVR system 308 can identify the caller based on caller ID, phone number, metadata, or other automatic information. In one aspect, region approximation should be as transparent as possible to the user and require little or no additional user interaction. The region approximater 310 retrieves data describing a list of customer specific services from a variety of sources such as TV service 312, phone service 314, mobile phone and other mobile device service 316, Internet service 318, user profile information 320, and other services.

For example, if the IVR system 308 is operated by a large communications company, the region approximater 310 can look up a user account based on the caller's phone number. The region approximater 310 can retrieve phone usage records, types of calls, language of transcribed voicemails, Internet browsing history, billing information, recorded and scheduled shows on a digital video recorder (DVR), user location from cell phone GPS signals, the types of television shows watched, and so forth. For example, the caller's phone number can be tied to a customer profile. The system can retrieve the customer profile to determine that the caller (or someone in the caller's household) watches Matlock with French subtitles, performs searches on the Internet at www.google.fr, and frequently makes cell phone calls to Paris. These and similar customer specific services data can provide clues indicating dialects in which the user is likely to speak.

The region approximater 310 can then generate country- or region-specific weights for dialects in a regional dialect database 322, and aggregate the weights to generate a summary weight. The region approximater 310 then passes the summary weight to the IVR system 308 which uses the summary weight either to tune the IVR language model or to select a language model and/or grammar from the regional dialect database 322. For example, the summary weight can indicate an 80% probability of Brazilian Portuguese as a primary language, an 18% probability of French, and a 2% probability of Italian. The IVR system 308 then recognizes speech received from the user 304 based on the selected language model or grammar.

The customer-specific services list can extend beyond services provided by a single company. In some cases, the system can use services which are not related to telecommunications, such as magazine subscriptions, sports participation, or a credit card purchase history.

In one aspect, the IVR system 308 and the region approximater 310 are operated by separate entities and the IVR system 308 accesses the region approximater 310 via application programmer interface (API) calls which return language model weights based on identifying information about the user 304, but do not allow access to the underlying customer specific services information that is used to generate the language model weights. In this way, consumer privacy in the customer specific services can be preserved while still providing benefit to dialect selection in speech recognition applications.

While some very large telecommunications companies have access to multiple sources of customer specific services information, non-telecommunications and other smaller companies may not. In some cases, a collaborative group of companies can share customer specific services information between each other in order to benefit as a group from the corresponding speech recognition benefits. For example, Company A has information about a customer's television viewing history, Company B has information about the customer's telephone records, and Company C has information about the customer's Internet usage. Companies A, B, and C can provide each other with access to customer specific services information that can provide a more accurate and complete picture of the dialect, language, or region of a particular customer.

In some cases, the caller 304 is identified by telephone number, but other information can be used as well. For example, if a user calls an automatic spoken dialog system to pay her electricity bill and must first enter her electric company account number, the electric company IVR system 308 can cross reference a customer database to look up a phone number associated with that account number. Then the IVR system 308 can make an API call to the region approximater 310 using the phone number. The region approximater can poll multiple sources for customer specific services information associated with that phone number to generate an aggregated weight.

Because the various sources 312, 314, 316, 318, 320 of customer specific services information may be hosted in different locations by different entities using different computing platforms and network infrastructure, their response times may vary. In this case, the region approximater 310 can provide an initial aggregate weight to the IVR system 308 based on currently available customer specific services information. As the region approximater 310 receives new information, it can incrementally update the aggregate weight. Thus, an initial aggregate weight to the IVR system 308 can indicate 95% certainty that the language is Russian, 3% certainty that the language is Ukrainian, and 2% certainty that the language is Czech. As the region approximater 310 receives additional information about other customer specific services, the aggregate weight, and the corresponding IVR grammar or language model, are updated. For example, a first set of additional information can tweak the aggregate weight to indicate 70% certainty that the language is Russian, 29% certainty that the language is Ukrainian, and 1% certainty that the language is Czech. A second set of additional information can tweak the aggregate weight to indicate 5% certainty that the language is Russian, 93% certainty that the language is Ukrainian, 1% certainty that the language is Czech, and 1% certainty that the language is Belorussian. In one aspect this approach does not rely on the user's speech, but only on the customer specific services information. In another aspect, this approach relies initially on the customer specific services information and on the incremental updates, but can further refine the IVR grammar or language model based on user speech, direct feedback and user interactions with the IVR, and/or indirect feedback from the user such as whether or not the user must repeat queries to be understood.

Figure 4:
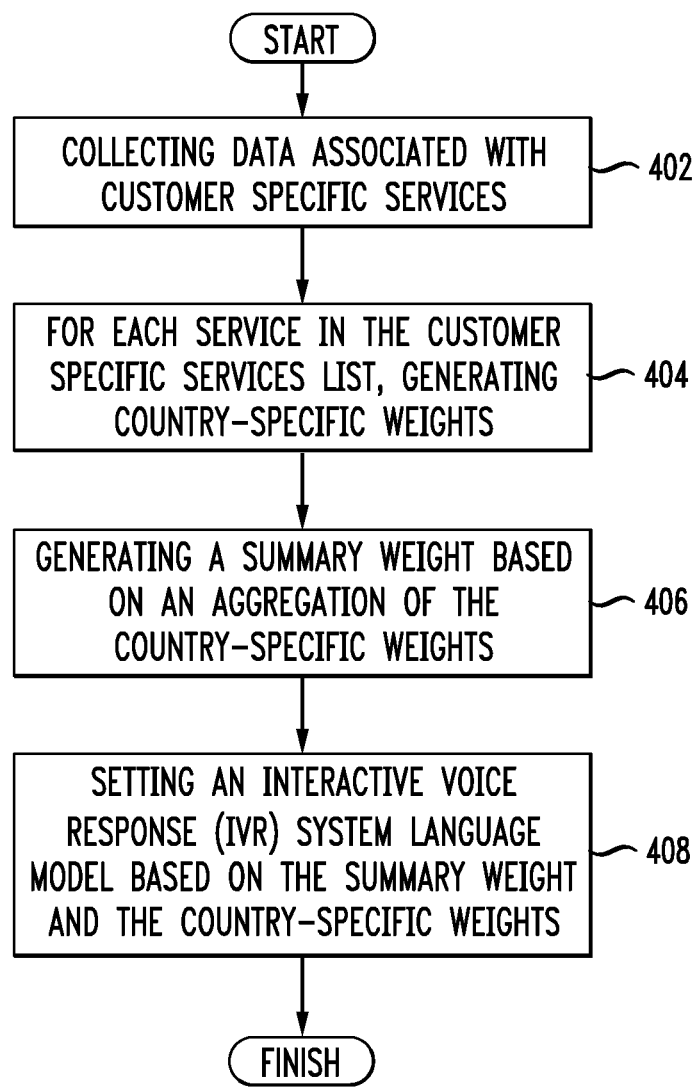
FIG. 4 illustrates an example method embodiment.

The disclosure now turns to the exemplary method embodiment shown in FIG. 4 for approximating an accent source. For the sake of clarity, the method is discussed in terms of an exemplary system 100 such as is shown in FIG. 1 configured to practice the method. The system 100 collects data associated with customer specific services (402). The data can originate from a single or multiple sources. The data can include phone records, internet service records, television service records, mobile device records, location information, and so forth. For example, a television service record can include listings such as "American Idol; 5 Mar. 2010; 8:30 pm-8:55 pm" or "Heridas de Amor; 13 Jun. 2010; 10:59 am-12:03 am". Television service records can also include viewing history, time of channel changes, content of viewed channels, digital video recorder (DVR) recording history, DVR scheduled shows, and viewing location.

Internet service records can include listings such as "www-.mlb.com; 22 Feb. 2010; 2:13 pm; referred by www.yahoo-.com; US-ASCII". Internet service records can further include customer requested top level domains (such as .com, .ru, .co.uk, .jp, .cn, or .ng), web page language encoding, browsing history, and viewed web page content. Phone records can include listings such as "Outgoing; 318-444-1234; Shreveport, La., United States; 34 minutes" or "Incoming; 011 33 6 1111 2222; Rennes, Brittany, France; 17 minutes". Location information can be reported based on a billing address, a work address, GPS information from a cellular phone, point of sale location for purchases, and so forth.

The system 100 generates country-specific weights for each service in the customer specific services list (404) and generates a summary weight based on an aggregation of the country-specific weights (406). The system can analyze the individual service records according to a set of predefined rules, keywords, adaptive rules, learning algorithms, and other suitable approaches. In one aspect the system learns based on feedback from the user and/or other user interactions with the system. For example, if the aggregated weight indicates two languages are similarly likely, i.e. 39% likelihood of Dutch and a 42% likelihood of German, and the user must often repeat herself to be properly understood, then the system can change to another likely grammar or language model. Further, the system can then adapt the weights for that particular set of services information to provide an aggregated weight that more accurately reflects the expected regional language or dialect for future speakers. In another example, the system analyzes what the user is saying, how the user is speaking, and other information to adjust the initial weights on the fly. The system can then adjust phoneme matching in the language model based on a possibility that the speaker is using one or more other languages. That possibility can be determined from an adjusted summary weight and adjusted country-specific weights which are adjusted in real time based on user interactions with the interactive voice response system. In this way, the weights provide a starting point which is further refined as the dialog between the user and the system progresses.

The system sets an interactive voice response (IVR) system language model based on the summary weight and the country-specific weights (408). In some cases, the IVR system changes the user interface based on the IVR language model. For example, system can eliminate from the spoken user interface certain vocabulary or dialog elements which are offensive or inappropriate in a culture associated with the language indicated by the summary weight. Alternatively, when the spoken dialog system is accompanied with a graphical display, the IVR system can adjust a splash screen or other graphical elements based on the summary weight and the country-specific weights. The IVR system can tune a voice recognition algorithm based on the summary weight and the country-specific weights and adjust phoneme matching in the language model based on a possibility that the speaker is using other languages based on the summary weight and the country-specific weights. The language model can be a recombinant accent mixture.

In this way, the system 100 can infer language domain information of a speaker from disparate data sources. Language domain information can be adjusted in real time as additional information becomes available.

In one reduced variation of the method, the system 100 collects data associated with a customer specific service, generates a country-specific weight for the customer specific service, and sets an interactive voice response system language model based on the country-specific weight. The steps outlined above and shown in FIG. 4 are optional variations on these concepts. For example, while FIG. 4 and the associated discussion disclose multiple customer specific services as a list, a single customer specific service is sufficient. Further, the summary weight is an optional component.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
collecting a customer specific services list associated with a customer about to use an interactive voice response system;
for each service in the customer specific services list, generating country-specific weights;
generating a set of summary weights for a plurality of countries based on an aggregation of the country-specific weights;
selecting an interactive voice response system language model based on the set of summary weights; and
recognizing speech received from the customer via the interactive voice response system based on the interactive voice response system language model.

2. The method of claim 1, wherein the interactive voice response system changes a user interface based on the interactive voice response language model.

3. The method of claim 1, wherein the interactive voice response system selects language options for a splash screen based on the country-specific weights.

4. The method of claim 1, wherein the interactive voice response system tunes a voice recognition algorithm based on the country-specific weights.

5. The method of claim 1, wherein the interactive voice response system adjusts phoneme matching in the interactive voice response system language model based on a possibility that the customer is using other languages based on the country-specific weights and the set of summary weights.

6. The method of claim 1, wherein the interactive voice response system further tracks, while recognizing speech from a customer, a number of times the customer repeats speech input.

7. The method of claim 1, wherein data associated with the customer specific services comprise one of a phone record, an internet service record, a television service record, a mobile device record, and location information.

8. The method of claim 7, wherein the internet service record comprises one of a customer requested top level domain, a web page language encoding, a browsing history, and a viewed web page content.

9. The method of claim 7, wherein the television service record comprises one of a viewing history, a time of channel changes, a content of viewed channels, a digital video recorder recording history, scheduled shows for recording, and a viewing location.

10. A system comprising:
a processor; and
a computer-readable storage medium having instructions stored which, when executed by the processor, cause the processor to perform a method comprising:
collecting a customer specific services list;
for each service in the customer specific services list, generating country-specific weights;
generating a set of summary weights for a plurality of regional language variations based on an aggregation of the country-specific weights;
selecting a system language model based on the set of summary weights; and
recognizing speech received from the customer based on the system language model.

11. The system of claim 10, the computer-readable storage medium having additional instructions stored which result in the method further comprising changing a user interface based on the interactive voice response system language model.

12. The system of claim 10, the computer-readable storage medium having additional instructions stored which result in the method further comprising selecting language options for a splash screen based on the set of summary weights and the country-specific weights.

13. The system of claim 10, the computer-readable storage medium having additional instructions stored which result in the method further comprising tuning a voice recognition algorithm based on the set of summary weights and the country-specific weights.

14. The system of claim 10, the computer-readable storage medium having additional instructions stored which result in the method further comprising adjusting phoneme matching in the language model based on a possibility that the speaker is using other languages based on an adjusted summary weight and adjusted country-specific weights, wherein the adjusted summary weight and the adjusted country-specific weights are adjusted in real time based on user interactions with the interactive voice response system.

15. The system of claim 10, the computer-readable storage medium having additional instructions stored which result in the method further comprising tracking, while recognizing speech from a customer, a number of times the customer repeats speech input.

16. The system of claim 10, wherein data associated with the customer-specific services list comprises one of a phone record, an internet service record, a television service record, a mobile device record, and location information.

17. A computer-readable storage device having instructions stored which, when executed by a computing device, cause the computing device to perform a method comprising:
collecting a customer specific services list associated with a customer about to use an interactive voice response system;
for each service in the customer specific services list, generating country-specific weights;
generating a set of summary weights for a plurality of countries based on an aggregation of the country-specific weights;
selecting an interactive voice response system language model based on the set of summary weights; and
recognizing speech received from the customer via the interactive voice response system based on the interactive voice response system language model.

18. The computer-readable storage device of claim 17, wherein the interactive voice response system selects language options for a splash screen based on the set of summary weights and the country-specific weights.

19. The computer-readable storage device of claim 17, wherein the interactive voice response system tunes a voice recognition algorithm based on the set of summary weights and the country-specific weights.

* * * * *